United States Patent [19]

Tabelev et al.

[11] 4,133,473
[45] Jan. 9, 1979

[54] METHOD FOR BRAZING FERROMAGNETIC MATERIALS

[76] Inventors: Vladislav D. Tabelev, ulitsa Saksaganskogo, 110, kv. 20; Leonid G. Puzrin, ulitsa Borschagovskaya, 16, kv. 98; Vladimir M. Kaschenko, ulitsa Naberezhno-Lugovaya, 5, kv. 36; Vyacheslav A. Beletsky, Bulvar Lesi Ukrainki, 5, kv. 78; Valentin A. Blanin, ulitsa Krasnoarmeiskaya, 14, kv. 13, all of Kiev, U.S.S.R.

[21] Appl. No.: 842,689

[22] Filed: Oct. 17, 1977

Related U.S. Application Data

[63] Continuation of Ser. No. 647,458, Jan. 7, 1976, abandoned.

[51] Int. Cl.$^2$ .............................................. B23K 1/04
[52] U.S. Cl. .................................... 228/215; 228/248; 228/263; 29/420
[58] Field of Search ............... 29/420, 744; 228/212, 215, 248, 263

[56] References Cited

U.S. PATENT DOCUMENTS

| | | | |
|---|---|---|---|
| 3,128,544 | 4/1964 | Allingham | 29/420 |
| 3,222,775 | 12/1965 | Whitney | 228/263 X |
| 3,442,010 | 5/1969 | Albers | 228/248 X |
| 3,444,613 | 5/1969 | Foerster | 228/263X |
| 3,717,442 | 2/1973 | Knopp | 228/263 X |

*Primary Examiner*—Al Lawrence Smith
*Assistant Examiner*—K. J. Ramsey
*Attorney, Agent, or Firm*—Lackenbach, Lilling & Siegel

[57] ABSTRACT

Disclosure is made of a method for brazing ferromagnetic materials whereby a metalloceramic braze, containing a ferromagnetic refractory component and a fusible component the melting point of which is lower than the Curie point for the refractory component, is placed in the gap between the materials to be joined. In the gap a magnetic field is created whose lines of force cross the gap and whose intensity is adequate enough to retain within the gap, the ferromagnetic refractory component in the process of brazing during the melting of the fusible component. The zone of joining the materials is heated to the temperature of brazing and then cooled. It is proposed also to use a metalloceramic braze, containing an alloy based on Cu—Co, consisting of 50–90% by weight of Cu, and a Cu-Mn-Ni alloy, containing 50–66% by weight of Cu, 24–34% by weight of Mn, and 2–16% by weight of Ni.

6 Claims, No Drawings

METHOD FOR BRAZING FERROMAGNETIC MATERIALS

This is a continuation of application Ser. No. 647,458, filed Jan. 7, 1976, now abandoned.

This invention relates to brazing, and more particularly to methods for brazing ferromagnetic materials and can find application in manufacturing various metal constructions from ferromagnetic materials, and also in joining all kinds of pipelines especially under conditions when it is difficult to assemble units with capillary clearances.

There are known methods for brazing, including brazing of ferromagnetic materials, which permit joining units with relatively large clearance gaps. These methods envisage the placing of braids or wires between the outer and inner surfaces of the units to be brazed.

One drawback of these methods, however, is the laborious operaton entailed in inserting the braids or wires into place, which restricts the application of these methods predominantly for telescopic joining of pipes or tubes.

These methods do not solve the problem of brazing upset butt joints so widely required in industry.

Another known method for brazing ferromagnetic materials is the one in which a metalloceramic braze is used, comprising a refractory component of premagnetized ferrous powder, coated with cadmium, and a low-melting component, which is the braze itself. Brazing is effected by using pellets of compacted metal powder, the weight ratio between the braze and the coated ferrous particles being 15-20:1.

The pellets which are shaped to match the clearance gap are placed in the zone of joining of the materials and are heated until the fusible phase is fully melted, the melting point of the latter being substantially lower than the Curie point of the premagnetized ferrous filler.

This makes it possible to preserve the magnetic properties of the compacted pellet, whereby it is retained in the zone of brazing which is thereafter cooled.

The above method is basically aimed at minimizing the consumption of the materials required for brazing as well as making it possible to automate the process.

A serious drawback of the aforementioned method for metalloceramic brazing is the need to premagnetize the ferrous filler and the complexity involved in compacting the pellets to the desired form that would correspond to the configuration of the gaps between the components to be joined.

The magnetic properties of the braze taken in the above ratio of its components are poor and actually can not be used to get a quality joint when wide gaps have to be filled, especially when brazing units with large cross-sectional areas.

The above method cannot solve the problem of assembling field joints, for example, when pipelines are laid and their axial alignment is not ensured, when the gaps between the pipes are not uniform, and when the pipes have torn surfaces or inferior surface finish. During heating, when the magnetic properties of a ferromagnetic unit and of the refractory component begin to deteriorate, the melted braze fails to be retained in the gap, and together with the ferrous particles starts to flow beyond the edges of the units to be joined, making it impossible for the brazing to be realized.

This drawback manifests itself particularly during brazing of vertical or almost vertical gaps, when each premagnetized particle acted upon by the considerable weight of the melted fusible component.

It is an object of the present invention to provide a method for brazing ferromagnetic materials with relatively wide and nonuniform gaps there between.

Another object of the invention is to provide a method that would not require costly and sophisticated equipment for its realization. Still another object of the invention is to provide an inexpensive braze for carrying out the proposed method for brazing ferromagnetic materials with wide and nonuniform gaps there between.

These objects are attained by that in a method for brazing ferromagnetic materials, whereby a metalloceramic braze is used containing a ferromagnetic refractory component and a fusible component whose melting point is lower than the Curie point of the refractory component, which braze is placed in the gap between the materials to be joined, heating the zone of joining of the materials to the temperature of brazing, then cooled, in accordance with the invention, set up in the gap is a magnetic field whose lines of force cross the gap and whose intensity is adequate enough to retain within the gap, the ferromagnetic refractory component during the melting of the fusible component.

It is advisable for the realization of this method to use a metalloceramic braze containing, as a refractory component, Cu—Co alloys consisting of 50-90% by weight of Cu and 50-10% by weight of Co, and, as a fusible component, alloys Cu-Mn-Ni consisting of 50-66% by weight of Cu, 24-34% by weight of Mn and 2-16% by weight of Ni.

The basic advantages of the present invention are as follows:

1. The possibility to braze articles made of ferromagnetic materials, including those made of a wide range of different classes of steel and cast-iron, with wide and nonuniform gaps there between, as well as having edges that do not require a high degree of finishing.

2. No pressure has to be applied to the components being brazed.

3. The possibility of brazing outdoors in any spatial positions, in cramped and hard-to-access places, as well as in situ, in the construction of various types of pipelines.

4. Simplicity of the facilities used for brazing.

5. Inexpensive ness of the braze used in the proposed method.

The proposed method is realized as follows. Induced in the gap between the ferromagnetic materials to be brazed into butt, overlapping or other type of joints is a permanent magnetic field whose lines of force intersect the gap.

Power supply is minimum of the lines of force of the magnetic field are perpendicular to the edges of the components to be joined.

The magnetic field in the gap may be produced through various ways. One of the simplest is the method of bringing the items to be brazed in contact with the opposite poles of, for example, a horse-shoe magnet.

An electromagnet may be used, which makes it possible, within the necessary limits, to vary the intensity of the magnetic field in the gap by varying the number of ampere-turns in the excitation coil.

The intensity of the magnetic field should be high enough to retain the refractory component within the gap during melting of the fusible component.

The intensity of the magnetic field is selected proportional to the gap width and area of the workpiece, the size of the particles of the refractory braze filler, and the ratio of the amount of the nonmagnetic phase, i.e. the fusible component, to that of the ferromagnetic refractory component.

For example, when brazing steel pipes ranging in diameter from 0.5" to 1" with the gaps therebetween being up to 2 mm and the particle size of the refractory Cu—Co filler being 30-50 microns, the intensity of the magnetic field in the gap should be 5,000-15,000 oersteds.

Given the required intensity of the magnetic field, it is possible, by a conventional method, to calculate the number of windings in the coil of the electromagnet assuming a supply voltage that is within the permissible safety limits.

The electromagnet's coil is energized through an ordinary rectifier.

An electromagnet made according to the above principle is light, compact and simple in service. It can be easily carried by a worker together with all the accessories.

The use of a permanent magnet helps to simplify the process of brazing since it does not require any source of energy, and this is very convenient in carrying out such work in field, on construction sites, etc.

In the gap between the ferromagnetic materials to be brazed is placed a metalloceramic braze including a mixture of powders, with the ferromagnetic retractory component (the filler) having a higher Curie point than the temperature of brazing.

The zone of joining of the ferromagnetic materials is heated to the melting point of the fusible component.

Due to the presence of an outer magnetic field, the particles of the filler become magnetized and are distributed uniformly along the field's magnetic lines of force, being retained within wide and nonuniform gaps. The particles keep the melted fusible phase in place, not allowing it to flow beyond the edges of the workpieces throughout the whole process of brazing.

Acetylene-oxygen gas torches, which are widely used in industry are employed for heating the perimeter of the butt joint of the brazed workpieces. Excellent results are obtained by using HF induction heating, which contributes to greater, efficiency of the brazing and improved working conditions. There are no gases involved in the process and continuous visual control of brazing in the course of heating can be carried out. The intensity of high frequency heating is rather high, and in the case of a cast-iron pipe having, for example, a diameter of 55 mm and walls 5 mm thick, the period of heating is about one minute.

It is also possible to use electric current for heating, passing it through the workpiece from edge to edge. Intensive generation of heat, causing melting of the braze, will take place in the area of lower conduction, i.e. in the gap filled with the metalloceramic braze.

Radiation heating can be employed with the aid of various radiators.

It is particularly advisable to use as the refractory phase binary alloys of copper and cobalt, in which the content of cobalt may range from 10 to 50% by weight, the balance being up to 100% by weight of copper.

As has already been mentioned, the lower content of cobalt in a braze, the cheaper it is, but then the magnetic properties there of are poorer, too. For, in this case, the filler will not be able to retain the melted fusible phase in the gap between the edges, and it will flow out. This disadvantage could be obviated by increasing the filler content in the braze, but that would again lead to increasing its cost. An alternative solution would be to use a stronger magnetic field; that, however, would necessitate special cumbersome apparatus.

This is why the above-mentioned lower limit of the cobalt content in the alloys has been selected such as to ensure high quality of the brazed joint whereas the upper limit has been selected from considerations of cost. The employment of copper-cobalt alloys as fillers is also prompted by their highly durable properties.

The brazed seam is reinforced by the refractory filler particles which are distributed uniformly in the excess fusible phase, forming, after crystallization, a reinforced compositional alloy.

The optimal content of the ferromagnetic filler in a metalloceramic braze is 30% by weight. The fusible phase constitutes 70% by weight; ratios of 20% weight to 80% by weight and 50% by weight to 50% by weight are possible too. The selection of these ratios is similar to that of the optimal content of cobalt in the filler.

As has been pointed out above, in order to obtain a highly durable brazing seam, the fusible phase's melting point should be as high as possible with the difference there between and the filler's Curie point being maintained within the specified limits.

It can be inferred from the above that in the case of brazing steel structures, the difference between the filler's Curie point and the melting point of the fusible phase should be no less than 80°-100° C.

Therefore, for the selected filler, the most suitable fusible alloy components to be used are those based on Cu—Mn—Ni, the content of the latter being as follows, wt.%: Cu-50 to 66; Mn — 24 to 34; and Ni — 2 to 16.

Alloys of said composition (in which the total content of the components should be 100%) impregnate particles of the Cu—Co filler quite well, and have an adequate degree of plasticity and durability.

The above described fusible phase has been elaborated on the basis of a binary Cu—Mn alloy with the lowest melting point of 870° C. and an addition of nickel.

It is known that the introduction of Ni stabilizes Cu—Mn alloys, fixes a solid solution, and improves the mechanical properties of these alloys. Even the introduction of 2% by weight of Ni into a Cu—Mn alloy considerably reduces the porosity of the brazing seams.

The corrosion resistance of brazed joints increases with the Ni content, but, on the other hand, an increase in the latter raises the cost of the fusible phase and renders it more brittle since this entails an increased content in the MnNi phase.

In order to lessen the amount of the brittle MnNi phase the maximum content of Mn should not exceed 34% by weight.

The content of Ni in the metalloceramic braze is selected equal to 2 to 16% by weight. When there is a large content of Ni, the braze exhibits poorer plastic properties and becomes much more expensive. It should also be borne in mind that an undesirable rise in the melting point of the fusible phase will take place.

For the brazing of articles operating in the presence of a corrosive medium, it is recommended to the fusible phases with the highest content of Ni, for example an alloy of 60% by weight of Cu, 34% by weight of Mn, and 16% by weight of Ni.

In brazing all purpose pipelines having diameters of up to 50 mm, it is advisable to use alloys with 8% by weight of Ni, and, for the brazing of less critical constructions, alloys with 2% by weight of Ni.

A variation in the contents of Cu and Mn within 10 to 15% with respect to the rated values is permissible provided a respective change occurs in the melting temperatures of the alloys, which is normally somewhere in the neighbourhood of 900° C. Therefore, taking into account the introduction of a third component the recommended alloys should have 50–66% by weight of Cu and 24–34% by weight of Mn. Since the melting point of the fusible phase is one of the important characteristics, we recommend the following compositions of alloys used in the preparation of metalloceramic brazes and their approximate melting points.

Content of elements, wt. %:

Alloy A: Cu-50; Mn-34; Ni-16; melting point 960° C.
Alloy B: Cu-62; Mn-30; Ni-8; melting point 930° C.
Alloy C: Cu-64; Mn-34; Ni-2; melting point 900° C.

The materials joining zone is heated till full melting of the fusible phase, but without exceeding the temperature of the magnetic transition (Curie) point of the filler; this is followed by contraction which is characteristic fritting and normal occurrence of the process.

The contraction of the braze is easily visible and may serve as an indication to stop heating. After the heating source is switched off, cooling takes place accompanied by crystallization of the melted fusible phase jointly with the solid filler resulting in a brazed seam.

In this case, brazing is carried out in the presence of a flux.

The use of a flux makes it possible to join ferromagnetic materials in air, the flux being selected according to the reactivity of the braze and the melting point of the fusible phase.

In the case of the proposed metalloceramic braze, it is advisable to use a flux consisting of 80% by weight of borax and of 20% by weight of boric acid. The quantity of the flux is determined as being equal to 30% of the total weight of the fusible component and filler.

The flux, just as all the components of the braze, is used in the form of a 30-50 micron powder. A carefully prepared powder mixture consisting of the fusible and refractory phases and the flux is diluted in alcohol or any other readily vaporizable solution for convenience in use to a consistency of sour cream and packed in the form of a paste in tubes, whereby it can be transported and preserved for a long time.

Other objects and advantages of the present invention will become more apparent from the following examples.

EXAMPLE 1

Brazing was carried out to join low-carbon steel pipes ½" in diameter. Their unprepared butt ends were brazed in air. Spatial position of the pipes was selected arbitrarily. In this case, a metalloceramic braze was used including a fusible phase of the following composition, wt.%: Cu-50; Mn-34; Ni-16, and a filler: Cu-50; Co-50.

The weight ratio of the fusible phase to the filler was 7:3. A flux composed of 80% by weight of borax and 20% by weight of boric acid was introduced in a quantity equal to 30% of the total weight of the metallic phase, that is of the weight of the fusible phase and the filler taken together.

The opposite poles of an electromagnet were connected to the butt ends of the pipes and a magnetic field having an intensity of 6,800 oersteds was set up in the gap. The required intensity of the magnetic field was attained by regulating the voltage in the coil of the electromagnet.

The braze, in the form of a paste, was applied to the outer edges of the pipes in the area of the gap, after which HF heating was conducted through an annular inductor.

The actual brazing time was determined by completed contraction of the molten braze and was equal to 30 seconds.

After switching off the heater and allowing the joint to cool for 10-15 seconds, the brazing process was completed.

The total brazing time including the preliminary and final operations, did not exceed 60 seconds.

The pipes brazed in the above-described manner were then subjected to static rupture tests. Rupture occurred under a load of 38.8 kg/mm$^2$, which corresponds to a 92% strength in relation to the base metal.

EXAMPLE 2

Pipes were brazed as in Example 1 with the following difference.

The fusible phase contained, wt.%: Cu-62; Mn-30; and Ni-8; the intensity of the magnetic field in the gap was 10,000 oersteds.

The strength of the brazed joints proved, as a result of static rupture tests, to be superior to that of the base metal. Ruptures in the pipes occurred well beyond the brazed seam.

EXAMPLE 3

Pipes were brazed as in Example 1 with the following difference.

A refractory filler composed of 10% by weight of Co and 90% by weight of Cu. The gap between the edges of the pipes was 1.5 mm wide. The intensity of the magnetic field was 14,500 oersteds.

The strength of the brazed seams under static rupture tests proved to be over 80% of that of the base metal. On the average, the pipes would break along the seam under a load of 35 kg/mm$^2$.

EXAMPLE 4

Brazing was carried out of steel rods 5 mm in diameter. The gap between the rods was more than 7 mm.

Powdered iron with a particle size of 30 microns was used as the refractory component, and a braze, based on Sn and Pb, the content of Sn being 61% by weight, was used as the fusible component.

A powder mixture was used composed of 80% by weight of the fusible phase and 20% by weight of the iron filler.

The brazing was effected with radiation heating from a tungsten spiral placed concentrically with the rods to be brazed. The intensity of the magnetic field in the gap was 5,000 oersteds.

The results showed that even with such wide gaps, corresponding to 1.5 d (d being the diameter of the brazed rods), brazing by the proposed method is possible. The strength of the joints was in this case determined by the strength properties of the fusible phase.

We claim:

1. A brazing method for joining ferromagnetic materials separated by a gap comprising:

filling said gap with a finely divided metalloceramic braze containing a ferromagnetic refractory component and a fusible component, wherein said fusible component has a melting point lower than the Curie point of said refractory component; imposing a magnetic field whose lines of force cross the gap, the intensity of said magnetic field being sufficient to retain the ferromagnetic refractory component within the gap during the brazing process; heating the joining zone including the gap to a temperature less than the Curie point but sufficient to melt the fusible component; and cooling the joining zone.

2. The method of claim 1 wherein said metalloceramic braze containing an alloy based on Cu—Co, comprising 50-90% by weight of Cu, and a Cu—Mn—Ni alloy, containing 50-66% by weight of Cu, 24-34% by weight of Mn and 2-16% by weight of Ni.

3. The method of claim 1 wherein the particle size of the brazed components vary from about 30 - 50 microns.

4. The method of claim 3, wherein the braze is applied to the ferromagnetic materials in the form of a paste.

5. The method of claim 1, wherein the ferromagnetic materials to be joined are pipes.

6. The method of claim 1, wherein the lines of force of said magnetic field are perpendicular to the gap.